US010429718B2

(12) United States Patent
Pant et al.

(10) Patent No.: US 10,429,718 B2
(45) Date of Patent: *Oct. 1, 2019

(54) APPARATUS AND METHODS FOR SINGLE PHOTON SOURCES

(71) Applicant: Massachusetts Institute of Technology, Cambridge, MA (US)

(72) Inventors: Mihir Pant, Cambridge, MA (US); Dirk Robert Englund, Brookline, MA (US); Mikkel Heuck, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/792,066

(22) Filed: Oct. 24, 2017

(65) Prior Publication Data

US 2018/0314131 A1 Nov. 1, 2018

Related U.S. Application Data

(63) Continuation of application No. 15/172,747, filed on Jun. 3, 2016, now Pat. No. 9,798,219.

(60) Provisional application No. 62/170,329, filed on Jun. 3, 2015.

(51) Int. Cl.
*G02F 1/31* (2006.01)
*G02F 1/39* (2006.01)
*H04B 10/70* (2013.01)
*G02F 1/35* (2006.01)

(52) U.S. Cl.
CPC .............. *G02F 1/31* (2013.01); *G02F 1/3501* (2013.01); *G02F 1/3536* (2013.01); *G02F 1/39* (2013.01); *H04B 10/70* (2013.01); *G02F 2001/3503* (2013.01)

(58) Field of Classification Search
None
See application file for complete search history.

(56) References Cited

U.S. PATENT DOCUMENTS 6,665,486 B2 * 12/2003 Tomita ................... B82Y 20/00
372/46.01
7,088,824 B1    8/2006 Takeuchi
(Continued)

OTHER PUBLICATIONS

Azuma et al., "All-photonic quantum repeaters," Nature Communications, vol. 6, pp. 1-7 (Apr. 15, 2015).
(Continued)

*Primary Examiner* — Rhonda S Peace
(74) *Attorney, Agent, or Firm* — Smith Baluch LLP

(57) ABSTRACT

A photon source to deliver single photons includes a storage ring resonator to receive pump photons and generate a signal photon and an idler photon. An idler resonator is coupled to the storage resonator to couple the idler photon out of the storage resonator and into a detector. Detection of the idler photon stops the pump photons from entering the storage resonator. A signal resonator is coupled to the storage resonator to couple out the signal photon remaining in the storage resonator and delivers the signal photon to applications. The photon source can be fabricated into a photonic integrated circuit to achieve high compactness, reliability, and controllability.

20 Claims, 8 Drawing Sheets

(56) References Cited

U.S. PATENT DOCUMENTS

| | | | |
|---|---|---|---|
| 7,745,816 B2* | 6/2010 | Mohseni | H01L 27/14643 257/12 |
| 7,760,970 B2* | 7/2010 | Baehr-Jones | G02F 1/3515 385/10 |
| 9,100,131 B2* | 8/2015 | Madey | H04B 10/70 |
| 9,488,897 B2* | 11/2016 | Oshima | G02F 1/365 |
| 9,798,219 B2 | 10/2017 | Pant et al. | |
| 2009/0091812 A1* | 4/2009 | Goto | G06N 10/00 359/107 |
| 2013/0087689 A1 | 4/2013 | Woodward et al. | |
| 2014/0153926 A1 | 6/2014 | Mower et al. | |
| 2017/0075190 A1 | 3/2017 | Rudolph et al. | |
| 2017/0212405 A1* | 7/2017 | Pant | G02F 1/39 |
| 2018/0314131 A1* | 11/2018 | Pant | G02F 1/3536 |

OTHER PUBLICATIONS

Biberman et al., "Ultralow-loss silicon ring resonators," Optic Letters, vol. 37, pp. 4236-4238 (Oct. 15, 2012).

Bissell, "Experimental Realization of Efficient, Room Temperature Single-Photon Sources with Definite Circular and Linear Polarizations," PhD Thesis, University of Rochester (2011).

Clausen et al., "Conditional quantum-state engineering in repeated 2-photon down-conversion," Applied Physics B-Lasers and Optics, vol. 72, pp. 43-50 (2001).

Collins et al., "Integrated spatial multiplexing of heralded single-photon sources," Nature Communications, vol. 4, pp. 1-7 (Oct. 10, 2013).

Darmawan et al., "Nested-Ring Mach-Zehnder Interferometer in Silicon-on-Insulator," IEEE Photonics Technology Letters, vol. 20, No. 1, pp. 9-11 (Jan. 1, 2008).

Ferrera et al., "Low power four wave mixing in an integrated, micro-ring resonator with Q = 1.2 million," Optics Express, vol. 17, No. 16, pp. 14098-14103 (Aug. 3, 2009).

Fiurasek et. al, "Conditional generation of arbitrary single-mode quantum states of light by repeated photon subtractions," Physical Review A, vol. 72, pp. 033822(11) (Sep. 13, 2005).

Gisin et al., "Quantum cryptography," Reviews of Modern Physics, vol. 74, pp. 145-195 (Mar. 8, 2002).

Glebov et al., "Deterministic generation of single photons via multiplexing repetitive parametric downconversions," Applied Physics Letters 103, pp. 031115(4) (Jul. 17, 2013).

Harris et al., "Integrated Source of Spectrally Filtered Correlated Photons for Large-Scale Quantum Photonic Systems," Physical Review X, vol. 4, pp. 041047(10) (Dec. 19, 2014).

Heuck et al., "On-Demand Single Photon Emission Based on Dynamic Photon Storage on a Photonic Integrated Circuit," Optical Society of America, 1 page (Jun. 21, 2015).

Huszar et al., "Adaptive Bayesian Quantum tomography," Physical Review A, vol. 85, pp. 052120(5) (May 22, 2012).

International Search Report and Written Opinion dated Jan. 26, 2017 for International Application No. PCT/US16/35718, 9 pages.

Jeffrey et al., "Towards a periodic deterministic source of arbitrary single-photon states," New Journal of Physics, 6, 15 pages (Jul. 29, 2004).

Johansson et al., "QuTiP 2: A Python framework for the dynamics of open quantum systems," Computer Physics Communications, vol. 184, pp. 1234-1240 (2013).

Kaneda et al., "Temporal Multiplexing toward Periodic and Deterministic Single-Photon Sources", in Conference on Lasers and Electro-Optics, USA, paper FM2A.5 (May 10-15, 2015).

Knill et al., "A scheme for efficient quantum computation with linear optics," Nature, vol. 409, pp. 46-52 (Jan. 4, 2001).

McCAUGHAN et al., "A Superconducting-Nanowire Three-Terminal Electrothermal Device," Nano Letters, vol. 14, pp. 5748-5753 (Sep. 18, 2014).

McCUSKER et al., "Efficient Optical Quantum State Engineering," Physical Review Letters, 103, pp. 163602(4) (Oct. 16, 2009).

Najafi et al., "On-chip detection of non-classical light by scalable integration of single-photon detectors," Nature Communications, vol. 6, pp. 1-8 (Jan. 9, 2015).

Notice of Allowance dated Jun. 21, 2017 for U.S. Appl. No. 15/172,747, 11 pages.

Pasquazi et al., "All-optical wavelength conversion in an integrated ring resonator," Optics Express, vol. 18, No. 4, pp. 3858-3863 (Feb. 15, 2010).

Silverstone et al., "On-chip quantum interference between silicon photon-pair sources," Nature Photonics, vol. 8, pp. 104-108 (Dec. 15, 2013).

Tanaka et al., "Dynamic control of the Q factor in a photonic crystal nanocavity," Nature Materials, vol. 6, pp. 862-865 (2007).

Xu et al., "Breaking the delay-bandwidth limit in a photonic structure," Nature Physics, vol. 3, pp. 406-410 (Apr. 22, 2007).

Madsen et al., "Integrated all-pass filters for tunable dispersion and dispersion slope compensation." IEEE Photonics Technology Letters 11.12 (1999): 1623-1625.

* cited by examiner

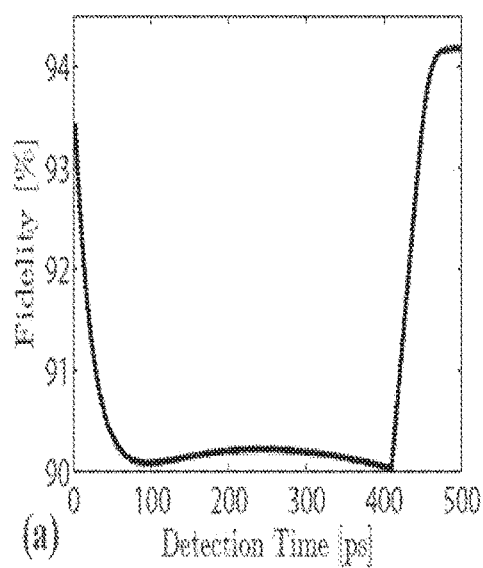
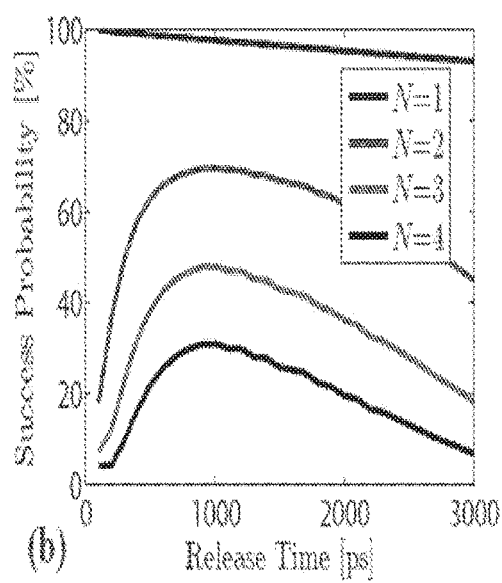
FIG. 4A  FIG. 4B

APPARATUS AND METHODS FOR SINGLE PHOTON SOURCES

CROSS-REFERENCE TO RELATED APPLICATION

This application is a continuation application of U.S. application Ser. No. 15/172,747, now U.S. Pat. No. 9,798,219, filed Jun. 3, 2016, entitled "Apparatus and Methods for Single Photon Sources," which claims priority to U.S. Application No. 62/170,329, filed Jun. 3, 2015, entitled "ON-DEMAND SINGLE PHOTON SOURCE BASED ON DYNAMIC PHOTON STORAGE ON A PHOTONIC INTEGRATED CIRCUIT," which is hereby incorporated herein by reference in its entirety.

GOVERNMENT SUPPORT

This invention was made with Government support under Grant No. FA9550-14-1-0052 awarded by the Air Force Office of Scientific Research. The Government has certain rights in the invention.

BACKGROUND

Single photon sources, which can deliver one photon at a time upon demand of a user, have a wide range of applications especially in quantum information technologies. For example, in quantum key distribution, single photons delivered by single photons sources can act as quantum bits (qubits), which store information in their polarization state or phase. Suppressing multi-photon states can be important in quantum key distribution, because a multi-photon state is susceptible to a photon number-splitting attack. Single photon sources can also be used in some implementations of quantum computers, which allow the solution of problems that cannot be solved efficiently by classical computation. In quantum lithography, the coherence of an n-photon number state, which can be produced by combining n single-photon states, can achieve an n-fold increase in the resolution of an interferometric measurement, compared to the Rayleigh resolution limit obtained using a classical beam containing n photons. In addition, single photons could also be useful in performing sensitive absorption measurements (e.g., quantum radiometry).

Existing single photon sources attempt to deliver single photons via various mechanisms, but each has its own drawbacks. For example, attenuated coherent light (e.g., a laser), which obeys Poisson statistics, may emit single photons by tuning the mean photon number to be one from a statistical point view. However, the fluctuations about that mean photon number can impair the repeatability of the source. In another example, single quantum dots in III-V and II-VI semiconductor heterostructures, or single trapped atoms and ions, can also be used as single-photon emitters, but most of these sources operate at cryogenic temperatures. Color centers combined with vacancy centers in diamond, such as N-vacancy centers, Ni—N complexes, Si-vacancy centers, and Xe-vacancy centers may also be employed to emit single photons, but the collection efficiency of these diamond-based sources is generally very low.

SUMMARY

Embodiments of the present invention include apparatus, systems, and methods of producing signal photons. In one example, a single-photon source includes a storage resonator to receive pump photons from a photon source at a pump frequency $\omega_P$ and to generate a signal photon at a signal frequency $\omega_s$ and an idler photon at an idler frequency $\omega_i$ from the pump photons. The signal frequency $\omega_s$ is different than the idler frequency $\omega_i$. The single-photon source also includes a detector, operably coupled to the storage resonator, to detect the idler photon and to generate a control signal in response to detection of the idler photon. A switch is operably coupled to the detector and optically coupled to the storage resonator to prevent transmission, in response to the control signal, and to allow transmission, in response to a clock signal, of subsequent pump photons from the photon source to the storage resonator. A signal resonator is optically coupled to the storage resonator to receive the signal photon out of the storage resonator and, in response to the clock signal, to couple the signal photon into an output coupler.

In another example, a method of delivering single photons includes coupling at least two pump photons at a pump frequency from a photon source to a storage resonator. A signal photon at a signal frequency and an idler photon at an idler frequency different than the signal frequency are the generated in the storage resonator from the at least two pump photons. The method also includes detecting the idler photon with a detector and preventing transmission of subsequent pump photons from the photon source to the storage resonator in response to detection of the idler photon in. The method further includes coupling the signal photon out of the storage resonator in response to a clock signal.

In yet another example, an apparatus to deliver single photons includes a pump ring resonator to receive pump photons at a pump frequency $\omega_P$ from a photon source. The pump resonator is configured to resonate at the pump frequency $\omega_P$. A storage ring resonator is optically coupled to the pump ring resonator, to receive the pump photons from the pump ring resonator and to generate a signal photon at a signal frequency $\omega_s$ and an idler photon at an idler frequency $\omega_i$ different than the signal frequency $\omega_s$. The storage ring resonator is configured to resonate at the signal frequency $\omega_s$. An idler ring resonator is optically coupled to the storage ring resonator to receive the idler photon generated in the storage ring resonator, wherein the idler ring resonator is configured to resonate at the idler frequency $\omega_i$. The apparatus also includes a photon detector, operably coupled to the idler ring resonator, to detect the idler photon from the idler ring resonator and to generate a control signal in response to detection of the idler photon. A switch is operably coupled to the photon detector and optically coupled to the pump ring resonator, to prevent transmission, in response to the control signal, and to allow transmission, in response to a clock signal, of subsequent pump photons from the photon source to the pump ring resonator. The apparatus further includes a signal ring resonator, optically coupled to the storage ring resonator, to resonate at the signal frequency $\omega_s$ in response to the clock signal and to couple the signal photon out of the storage ring resonator.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 4A shows fidelity of the single-photon source shown in FIG. 3A as a function of the detection time.

FIG. 4B shows maximum success probability of the single-photon source shown in FIG. 3A as a function of release time.

DETAILED DESCRIPTION

Single Photon Sources Using Ring Resonators

In applications of single photon sources (SPSs), it is usually desirable for the photon sources to have the following properties. First, the single photon is produced at a specific time, or within a definite time bin (i.e., an "on-demand" SPS). On-demand SPSs usually use a pulsed excitation source and can be particularly useful in quantum key distribution and quantum computation, where qubits are typically received at definite time intervals. Second, it can be desirable for the SPS to be efficient. The efficiency of the photon source producing a single photon, given one optical or electrical excitation, is desired to be as close to unity as possible. Third, for quantum information applications, it is helpful for the SPS to produce photons with a definite polarization, since introducing a polarizer after the unpolarized source may waste, on average, half the photons. In addition, it can also be desirable for single photon sources to have a high bit rate, operate at room temperature, and be robust and easy to implement.

To achieve at least some of the above desirable properties in single photon sources, apparatus and methods described herein employ a photonic integrated circuit (PIC) approach that integrates non-classical light sources with optical gates and detectors to produce single photons. A combination of heralding and dynamic photon storage is employed to achieve on-demand single photon emission on CMOS-compatible PICs. The optical gates and dynamic photon storage are realized using ring resonators, which can be manufactured using semiconductor fabrication techniques and integrated into a compact circuit. Compared to conventional photon sources using bulk optics, the PIC single photons sources, can have a much smaller form factor, improved mechanical stability (e.g., more robust against misalignment), and better controllability (e.g., using modulation of the ring resonator to control the timing).

Figure 1A:
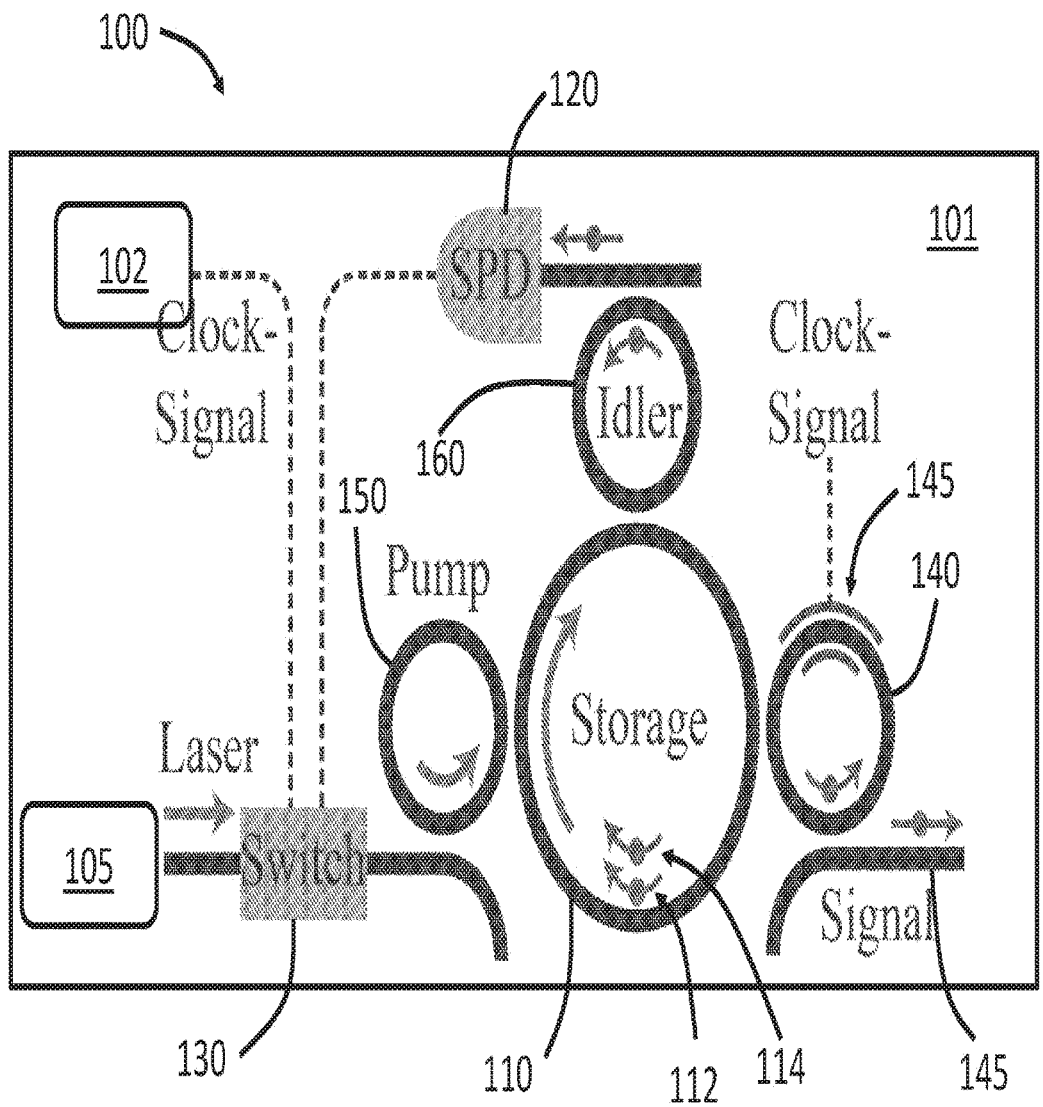
FIG. 1A shows a schematic of an on-demand single photon source using ring resonators.

FIG. 1A shows a schematic of a photon source 100 using ring resonators for optical gating and dynamic photon storage and delivery. The photon source 100 includes a light source 105 to provide pump light at frequency $\omega_p$. The pump light can be either continuous wave (CW) or pulsed. The pump light propagates into a switch 130, which can transmit or block the pump light, depending on the control signals received by the switch 130. The switch signals come from two sources: one is a clock-signal from a clock 102 and another is from a photon detector 120 (to be described below). A pump resonator 150 is coupled to the switch 130 (e.g., via evanescent coupling to a waveguide connected to the switch 130) to receive the pump light and further transmit the light beams to a storage resonator 110. The pump resonator 150 can also couple pump light out of the storage resonator 110 when, for example, the switch 130 is off (blocking pump light from entering the pump resonator 150). In this case, the pump resonator 150 functions as a photon sink to couple excess pump photons out of the storage resonator 110.

The storage resonator 110 can have a resonant frequency substantially equal to the pump frequency $\omega_p$ to trap the pump light for generating signal photons and idlers photons. In one example, the storage resonator 110 can trap two pump photons at pump frequency $\omega_p$ to generate one signal photon 112 at signal frequency $\omega_s$ and one idler photon 114 at idler frequency $\omega_i$ via four wave mixing (FWM) based on Kerr nonlinearity. The three frequencies can satisfy the preservation of energy: $2\omega_p=\omega_s+\omega_i$. Using resonators to generate signal-idler photon pairs can have high nonlinear efficiency by effectively recycling the optical pump power within the cavity. The nonlinear efficiency can depend on, for example, the quality factor of the storage resonator 110. In on example, the quality factor of the storage resonator 110 can be greater than 5,000. In another example, the quality factor of the storage resonator 110 can be greater than 10,000. In yet another example, the quality factor of the storage resonator 110 can be greater than 20,000.

The storage resonator 110 is further coupled with two more resonators. An idler resonator 160, resonating at the idler frequency $\omega_i$, is evanescently coupled to the storage resonator 110 to couple out the idler photon 114. The idler resonator 160 further transmits the idler photon 114 to the photon detector 120. Upon detection of the idler photon 114, the detector 120 generates a control signal to close the switch 130 to block further transmission of pump light into the storage ring resonator 110. The processes of coupling out the idler photon 114, detecting the idler photon 114, generating the control signal, and closing the switch 130 can be fast enough such that the switch 130 is closed before the generation of second pair of signal and idler photons. In this case, after the coupling out of the idler photon 114, the storage resonator 110 may have a single signal photon 112 circulating within the resonator. If there are excess pump photons (e.g., pump photons that are not converted into signal and idler photon pairs) in the storage resonator 110 after the closing of the switch 130, the pump resonator 150 can couple them out to clean the storage resonator 110.

A signal resonator 140 is also evanescently coupled to the storage resonator 110. The signal resonator 140 includes a modulator 145 that can modulate the resonant frequency of the signal resonator 140. For example, without modulation, the signal resonator 140 can have a resonant frequency $\omega_{s0}$.

Upon receiving a clock signal (e.g., a manual control signal or an automatic one), the modulator 145 can change the resonant frequency to $\omega_s$ of the signal resonator 140 so as to couple out the signal photon 112 circulating in the storage resonator 110 and transmit the signal photon 112 to an output waveguide 145 for applications. After the delivery of the signal photon 112, a new process of single photon generation can start from opening the switch 130 and transmitting pump photons into the storage resonator 110 for signal-idler photon generation.

Figure 1B:
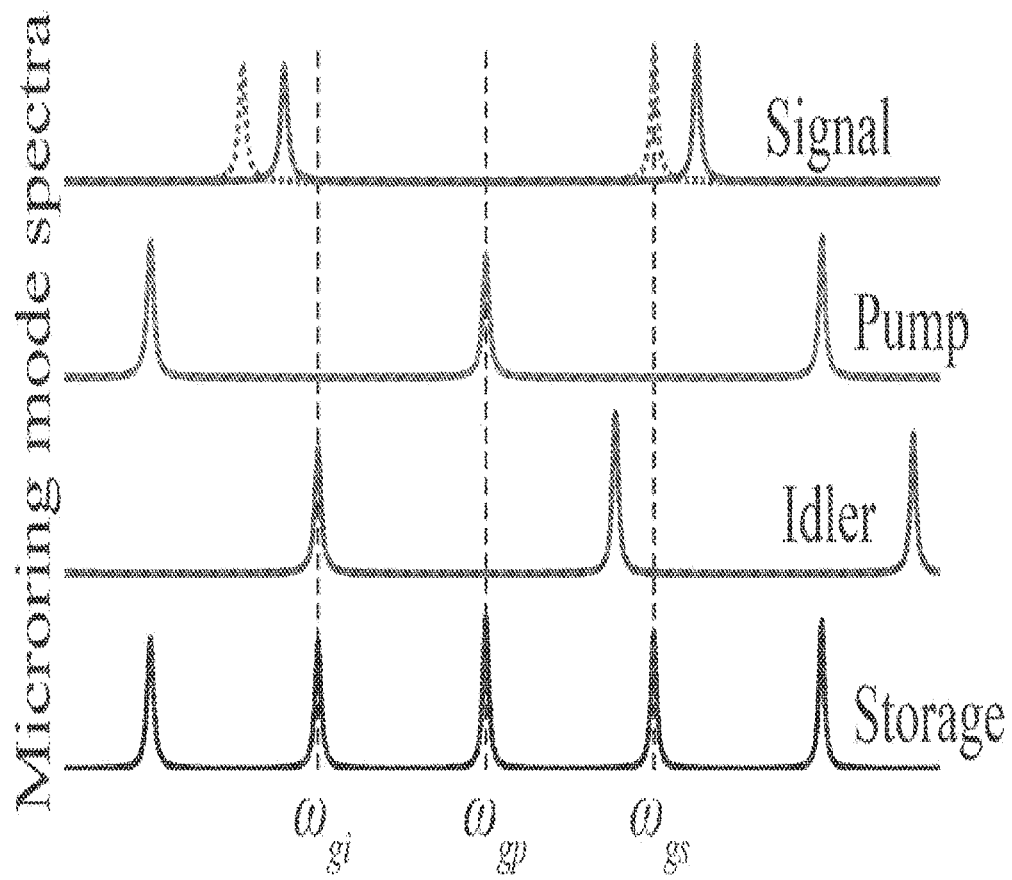
FIG. 1B shows mode spectra of different ring resonators in the single-photon source shown in FIG. 1A.

FIG. 1B shows mode spectra of the different ring resonators in the photon source 100 shown in FIG. 1A. Using the photon source 100 with reference to the mode spectra, one example photon emission cycle can include the following steps. First, at least two pump photons are sent into the storage ring 110, where a pair of a signal photon 112 and an idler photon 114 is generated. Then, the idler photon 114 of the signal-idler pair is coupled to the detector 120 via the idler resonator 160, which can be resonant with $\omega_i$. In response to sensing the idler photon, the detector 120 triggers the switch 130 to stop the pump laser from entering the pump resonator 150. Any pump photons remaining in the storage resonator 110 can be coupled out via the pump resonator 150 to reduce the probability of generating additional photon pairs. The signal photon 112 is kept in the storage resonator 110 until a clock-signal arrives at the signal resonator 140, causing the signal resonator 140 to temporarily tune into resonance with $\omega_s$ to release the signal photon 112, before returning to its uncoupled state. The clock-signal also arrives at the switch 130, which responds by returning to its open state, completing the cycle.

The degree of determinism in the photon emission of the photon source 100 can depend on the intrinsic lifetime of the storage resonator 110. To increase the determinism, the quality factor of the storage resonator 110 can be substantially greater than the detector jitter, the lifetimes of the three modes ($\omega_p$, $\omega_i$, and $\omega_s$) when resonant with their corresponding access resonators (pump resonator 150, idler resonator 160, and signal resonator 140, respectively), as well as the operation time of the control elements. In one example, lifetimes of about 10 ns can be achieved in silicon resonators, thereby making state of the art electrical control components with operating speeds of about 10 ps to about 100 ps sufficient. This can also allow for integration of on-chip electrical control in the CMOS fabrication of large-scale PICs. Furthermore, the controllable release of photons can enable pulse shaping of the wave packets, which can in turn influence the performance of quantum information processing systems.

The entire photon source 100 can be fabricated in a single substrate 101 (also referred as a single chip) to decrease the size, thereby improving the miniaturization. Various thin-film based platforms can be employed to fabricate the apparatus 100. In one example, the apparatus 100 can be fabricated on a silicon-on-insulator (SOI) platform. In another example, the apparatus 100 can be fabricated on a lithium niobate platform (also referred to as lithium niobate-on-insulator platform). In yet another example, the apparatus 100 can be fabricated on an aluminum nitride (AlN) platform. In yet another example, the apparatus 100 can be fabricated on a silicon nitride platform.

The resonators, including the storage resonator 110, the signal resonator 140, the pump resonator 150, and the idler resonator 160, can be ring resonators that can be fabricated using existing semiconductor fabricated techniques. Various materials may be used to form the ring resonators (and the output waveguide 140), such as silicon, germanium, silicon oxide, silicon nitride, and chalcogenide glass.

The diameters of the ring resonators may depend on, for example, the desired resonance wavelength ($\Delta = \omega/c$, where $\omega$ is the resonant frequency such as $\omega_p$, $\omega_i$, and $\omega_s$) and/or the desired number of supported longitudinal modes. As understood in the art, the resonance wavelength $\lambda$ of the mth mode in a ring resonator is $\lambda = D\pi n_{eff}/m$, where D is the resonator diameter, $n_{eff}$ is the effective refractive index (RI) of the mth mode of the ring resonator, and m is an integer. In one example, the ring resonators support only one longitudinal mode (m<1 for a given D and $\lambda$). In another example, the ring resonators support multiple longitudinal modes. The resonance wavelength of the ring resonators can be about 1 µm to about 40 µm (e.g., 1 µm, 5 µm, 10 µm, 15 µm, 20 µm, 25 µm, 30 µm, 35 µm or 40 µm). In another example, the resonant wavelength of the ring resonators can be similar to those used in optical communications (including the internet), at wavelengths between about 1.4 µm and about 1.7 µm (e.g., 1.4 µm, 1.5 µm, 1.55 µm, 1.6 µm, 1.65 µm, and 1.7 µm). In practice, the diameter D of the ring resonators can be about 5 µm to about 150 µm (e.g., 5 µm, 7.5 µm, 10 µm, 15 µm, 20 µm, 25 µm, 30 µm, 40 µm, 50 µm, 60 µm, 70 µm, 80 µm, 90 µm, 100 µm, 110 µm, 120 µm, 130 µm, 140 µm, or 150 µm). The cross section of the ring resonators can have various shapes, such as round, oval, rectangular, square, or any other shape known in the art. In one example, the cross section of the ring resonators can have a size that is about 220 nm by 500 nm.

The detector 120 coupled to the idler resonator 160 is employed to detect the idler photon 114 and therefore monitor the photon pair generation within the storage resonator 110. In practice, it can be helpful for the detector 120 to have the following properties: 1) high detection efficiency, i.e., high probability that a photon is successfully detected every time it hits the detector; 2) low dark current, i.e., low probability that the detector registers a photon when none is there; 3) low reset or "dead time", i.e., a short interval after a detection during which the device cannot detect a new photon; 4) low cross-talk, i.e., low probability that neighboring pixels detect photons arising from the detection process in a given pixel; and 5) low "timing jitter", i.e., low uncertainty in specifying when a photon arrives.

In one example, the detector 120 can include a single avalanche photodiode (APD). In another example, the detector 120 includes an array of APDs, which are reverse-biased variants of p-n junction photodiodes. Typically, one pixel includes one APD, one biasing circuit, one timing circuit, and an interface to the readout circuitry (e.g., shift registers) for the array. Without being bound any particular theory or mode of operation, reversely biasing a p-n junction photodiode can generate an electric field in the vicinity of the junction. The electric field tends to keep electrons confined to the n side and holes confined to the p side of the junction. Absorption of a photon having sufficient energy (e.g., >1.1 eV for silicon) can produce an electron-hole pair. The electron in the electron-hole pair drifts to the n side and the hole drifts to the p side, resulting in a photocurrent flow in an external circuit.

The same principle also allows an APD to detect light. However, an APD is typically designed to support high electric fields to facilitate impact ionization. More specifically, the electron and/or the hole in an electron-hole pair generated by photon absorption can be accelerated by the high electric field, thereby acquiring sufficient energy to generate a second electron-hole pair by colliding with the crystal lattice of the detector material. This impact ionization can multiply itself many times and create an "avalanche" of electron-hole pairs. A competition can develop between the rate at which electron-hole pairs are being generated by impact ionization and the rate at which they exit the high-field region and are collected. The net result can be dependent on the magnitude of the reverse-bias voltage: if the magnitude is below a particular value (commonly known as the breakdown voltage), collection normally outruns generation, causing the population of electrons and holes to decline. An APD operating in this condition is normally referred to as a linear mode APD. Each absorbed photon normally creates on average a finite number M (also referred to as the internal gain) of electron-hole pairs. The internal gain M is typically tens or hundreds.

While M might be the average number of electron-hole pairs generated by one absorbed photon, the actual number may vary, inducing gain fluctuations. This gain fluctuation can produce excess noise, or multiplication noise, which typically gets progressively worse with higher M. Therefore, once the point is reached where the multiplication noise dominates over the noise introduced by downstream circuitry, further increases in gain may reduce the system's signal-to-noise ratio (SNR). The multiplication noise can also depend on material properties because, in general, electrons and holes have different likelihoods of initiating impact ionizations. For example, in Si, electrons tend to be much more likely to impact ionize compared to holes. Therefore, it can be helpful for electrons to initiate impact ionization in silicon-based APDs.

In another example, the detector 120 can include an APD operating in Geiger mode (also referred to as a Geiger-mode APD or GmAPD). A GmAPD operates when the reverse biased voltage is above the breakdown voltage. In this case, electron-hole pair generation normally outruns collection, causing the population of electrons and holes in the high-field region and the associated photocurrent to grow exponentially in time. The growth of photocurrent can continue for as long as the bias voltage is above the breakdown voltage.

A series resistance in the diode, however, can limit the current growth by increasing the voltage drop across the series resistance (thereby reducing the voltage across the high-field region) as the current grows. This effect can therefore slow the rate of growth of the avalanche. Ultimately, a steady-state condition can be reached in which the voltage across the high-field region is reduced to the breakdown voltage, where the generation and extraction rates balance. Stated differently, the series resistance can provide negative feedback that tends to stabilize the current level against fluctuations. A downward fluctuation in current can cause a decrease in the voltage drop across the series resistance and an equal increase in the drop across the APD high-field region, which in turn increases the impact-ionization rates and causes the current to go back up.

The quenching circuit of the APD employed for the photon source 100 can be either passive or active. In a passive-quenching circuit, the APD is charged up to some bias above breakdown and then left open circuited. The APD then discharges its own capacitance until it is no longer above the breakdown voltage, at which point the avalanche diminishes. An active-quenching circuit actively detects when the APD starts to self-discharge, and then quickly discharges it to below breakdown with a shunting switch. After sufficient time to quench the avalanche, the active-quenching circuit then recharges the APD quickly using a switch.

In yet another example, the detector 120 can include an array of superconducting nanowire single-photon detectors (SNSPDs), each of which typically includes a superconducting nanowire with a rectangular cross section (e.g., about 5 nm by about 100 nm). The length is typically hundreds of micrometers, and the nanowire can be patterned in compact meander geometry so as to create a square or circular pixel with high detection efficiency. The nanowire can be made of, for example, niobium nitride (NbN), tungsten silicide (WSi), $YBa_2Cu_3O_{7-\delta}$, or any other substrate material known in the art.

In operation, the nanowire can be maintained below its superconducting critical temperature Tc and direct current biased just below its critical current. Without being bound by any particular theory of mode of operation, incident photons having sufficient energy to disrupt hundreds of Cooper pairs in a superconductor can form a hotspot in the nanowire. The hotspot itself typically is not large enough to span the entire width of the nanowire. Therefore, the hotspot region can force the super-current to flow around the resistive region. The local current density in the sidewalks can increase beyond the critical current density and form a resistive barrier across the width of the nanowire. The sudden increase in resistance from zero to a finite value generates a measurable output voltage pulse across the nanowire.

Various schemes can be employed in SNSPD to improve the detection performance. In one example, the SNSPD can employ a large area meander strategy, in which a nanowire meander is written typically across a 10 μm×10 μm or 20 μm×20 μm area to increase the active area and improve the coupling efficiency between the incident photons and the SNSPD. In another example, the SNSPD can include a cavity and waveguide integrated design, in which a nanowire meander can be embedded in an optical cavity so as to further increase the absorption efficiency. Similarly, a nanowire can be embedded in a waveguide so as to provide a long interaction length for incident photons and increase absorption efficiency. In yet another example, ultra-narrow nanowires (e.g., 20 nm or 30 nm) can be employed to construct the nanowire meander so as to increase the sensitivity to low-energy photons.

In yet another example, the detector 120 can include a transition edge sensor (TES), which is a type of cryogenic particle detector that exploits the strongly temperature-dependent resistance of the superconducting phase transition.

The modulator 145 in the signal resonator 140 can be used to control the release of the signal photon 112 by tuning the resonant wavelength of the signal resonator 140 (e.g., red-shifting the cavity resonance). The modulator 145 used for the signal resonators 140 can be based on various mechanisms, depending on, for example, the desired form factor, dynamic range of modulation, power consumption, etc. In one example, the modulator 145 can include a piezo-electric element or other suitable element configured to apply a mechanical force to the signal resonator 140 so as to modulate the refractive index of the signal resonator 120. The mechanical force can be applied via compression, bending, stretching, shearing, or any other means known in the art.

In another example, the modulator 145 can be configured to apply an electric field to the signal resonator 140 so as to modulate the refractive index of the signal resonator 140. For example, the modulator 145 may apply the electric field via two electrodes, with one electrode attached to the top of the signal resonator 140 and the other electrode attached to the bottom of any substrate supporting the signal resonator 140. Alternatively or additionally, the electrodes can be attached to a perimeter of the storage resonator 120.

In yet another example, the modulator 145 can be configured to vary a temperature of the signal resonator 140. For example, the modulator 145 can include a semiconductor heater fabricated in thermal communication with (e.g., beside) the signal resonator 140. In another example, the modulator 145 can include a semiconductor heater fabricated beneath the signal resonator 140 or within the signal resonator 140, heating the signal resonator 140 to change the resonant wavelength of the signal resonator 140.

In yet another example, the modulator 145 is configured to apply an acoustic field to the signal resonator 140 so as to modulate the refractive index of the signal resonator 140. In other examples, the modulator 145 can be configured to apply a magnetic field to the signal resonator 140 so as to modulate the refractive index of the signal resonators 140.

If the signal resonator 140 comprises chalcogenide glass, the modulator 145 can apply an optical field on the signal resonator 140 so as to modulate the refractive index of the chalcogenide glass. As understood in the art, chalcogenide glasses can exhibit several photo-induced effects, including photo-crystallization, photo-polymerization, photo-decomposition, photo-contraction, photo-vaporization, photo-dissolution of metals, and light-induced changes in local atomic configuration. These changes are generally accompanied by changes in the optical band gap and therefore optical constants. In addition, chalcogenide glasses also have strong third-order nonlinear effects. Therefore, a modulator comprising chalcogenide glass can adjust the optical properties of the signal resonator 140 by applying a modulating optical field (separate from the light circulating in the signal resonator 140) to the signal resonator 140.

Ring-Ring Coupling Gates

In the photon source shown in FIG. 1A, the storage resonator 110 is evanescently coupled to other resonators, such as the signal resonator 140, the pump resonator 150, and the idler resonator 160. Alternatively or additionally, the coupling between two ring resonators can be achieved by a coupling structure including a nested-ring Mach-Zehnder interferometer.

Figure 2A:
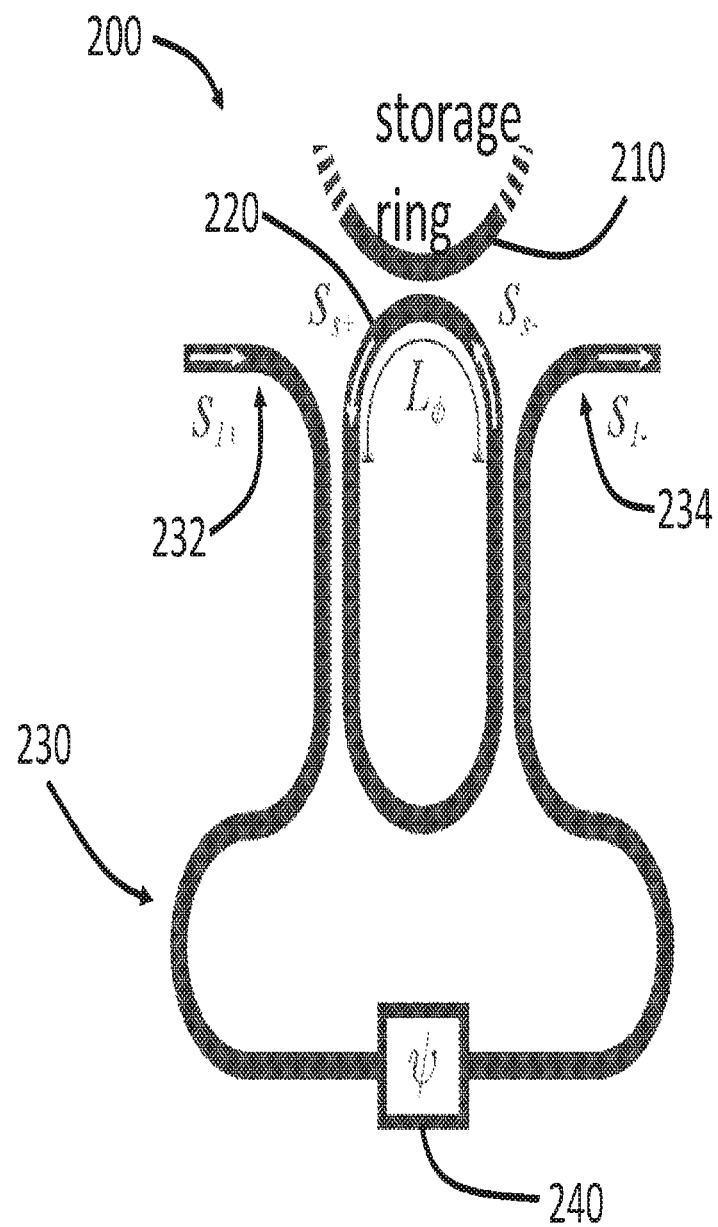
FIG. 2A shows a schematic of a coupler that can be used in the single-photon source shown in FIG. 1A.

FIG. 2A shows a schematic of a coupling structure 200 that can be used in ring-based photon sources. The structure 200 includes a storage ring 210, which can be substantially similar to the storage resonator 110 shown in FIG. 1A and described above. A second ring 220 (e.g., the signal resonator 140, the pump resonator 150, or the idler resonator 160) is evanescently coupled to the storage ring 210. A waveguide 230, including an input portion 232 and an output portion 234 is evanescently coupled to the second ring 220. A phase shifter 240 is disposed in the waveguide 230.

Figure 2B:
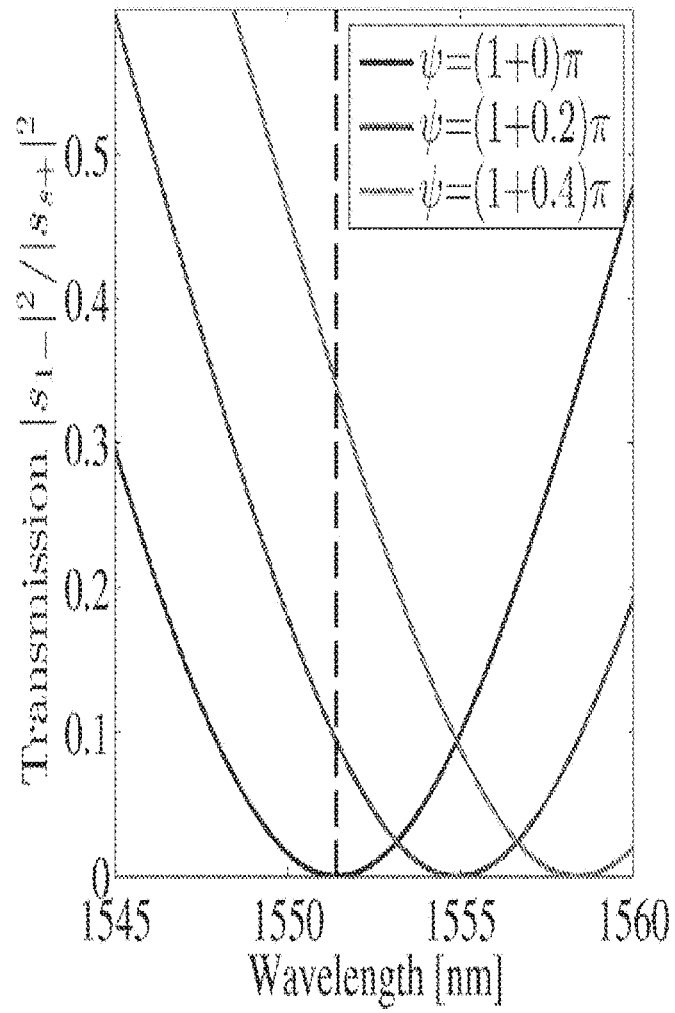
FIG. 2B shows transmission spectra of the coupler shown in FIG. 2A at different phase delays.

FIG. 2B shows transmission spectra of the structure when the phase shifter 230 applies different amounts of phase shift. The input light has central wavelength at about 1550 nm. As seen from FIG. 2B, when a 7 phase shift is applied by the phase shifter 240, the structure 200 is in a closed state and the transmission spectrum has absorption peak at the central wavelength 1550 nm. When the phase shifter 240 applies any other amount of phase shift, the structure 200 is in an open state and transmits light at 1550 nm. More information on ring-ring coupling can be found in S. Darmawan, et al., Nested-Ring Mach-Zehnder Interferometer in Silicon-on-Insulator, *IEEE PHOTONICS TECHNOLOGY LETTERS*, Vol. 20, No. 1, 9 (2008), which is hereby incorporated herein by reference in its entirety.

Single Photon Sources Using Frequency Selective Tunable Gates

The photon source 100 shown in FIG. 1A uses ring resonators to couple light (including pump light, idler photons, and signal photons) into or out of the storage resonator. In practice, this coupling can be achieved by general frequency selective tunable gates.

Figure 3A:
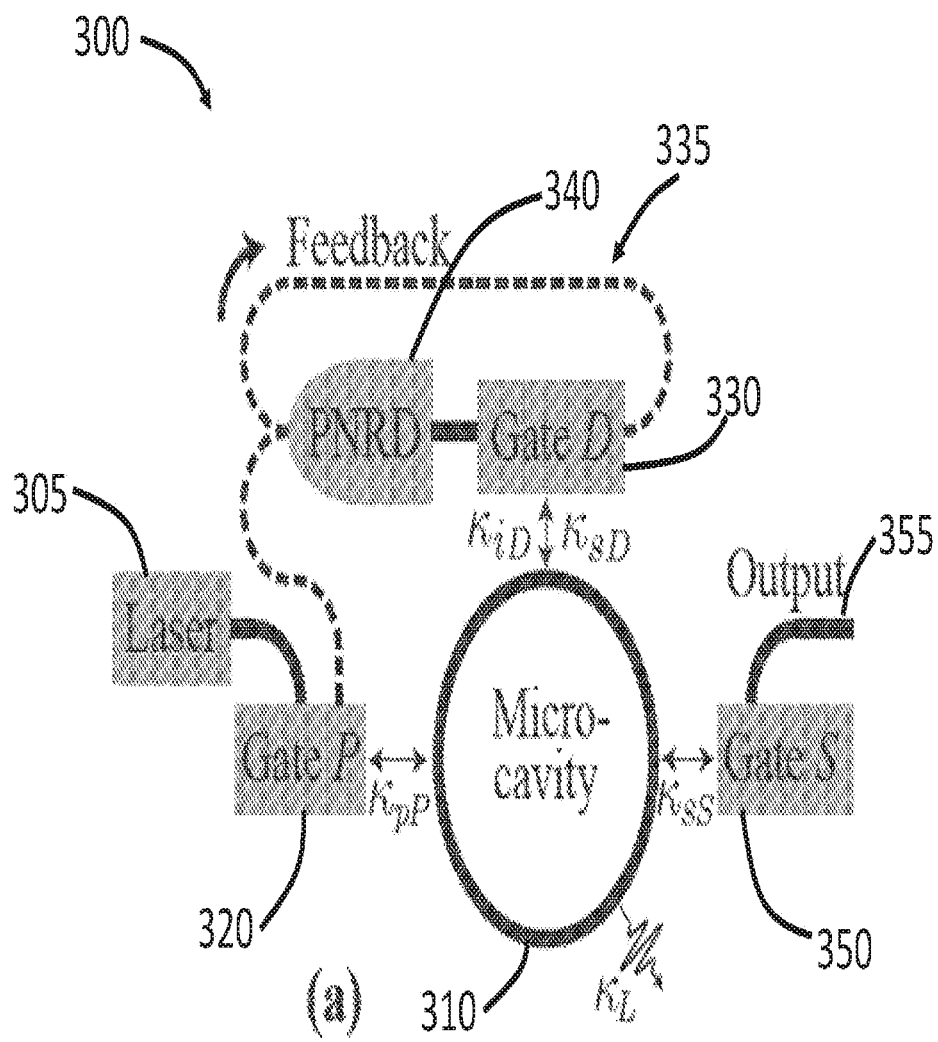
FIG. 3A shows a schematic of a single-photon source using frequency selective tunable gates.

FIG. 3A shows a schematic of a photon source 300 using frequency selective tunable gates. The photon source 300 includes a storage ring 310, which can be an ultrahigh Q micro-cavity with a nonlinearity $\chi^{(2)}$ or $\chi^{(3)}$ that allows signal and idler photons to be generated in pairs. A pump gate 320 couples the storage ring 310 to a driving laser 305. The pump gate 320 can control the addition of photons into the storage ring 310. A detector gate 330 couples the storage ring 310 to a detector 340, which can generate a control signal to control the pump gate 320 as well as the detector gate 330 via a feedback link 335. The detector gate 330 can control the subtraction of photons in the storage ring 310. A signal gate 350 couples the storage ring 310 to an output waveguide 355, which delivers the single photos to applications. In addition, solid lines in FIG. 3A represent optical waveguides, while dashed lines represent electrical control signals.

The operation of the photon source 300 can be divided into generation part and release. During generation, the detector gate 330 is open only to idler photons ($\kappa_{iD} \neq 0$ and $\kappa_{sD} = 0$, where $\kappa_{iD}$ and $\kappa_{sD}$ are the transmission ratio of the idler photon and signal photon, respectively). Generation ends by turning off the pump (i.e., $\kappa_{pP} \rightarrow 0$). Release begins by opening the detector gate 330 to signal photons (i.e., $\kappa_{sD} \neq 0$) when there are no more idler or pump photons in the storage ring 310.

Figure 3B:
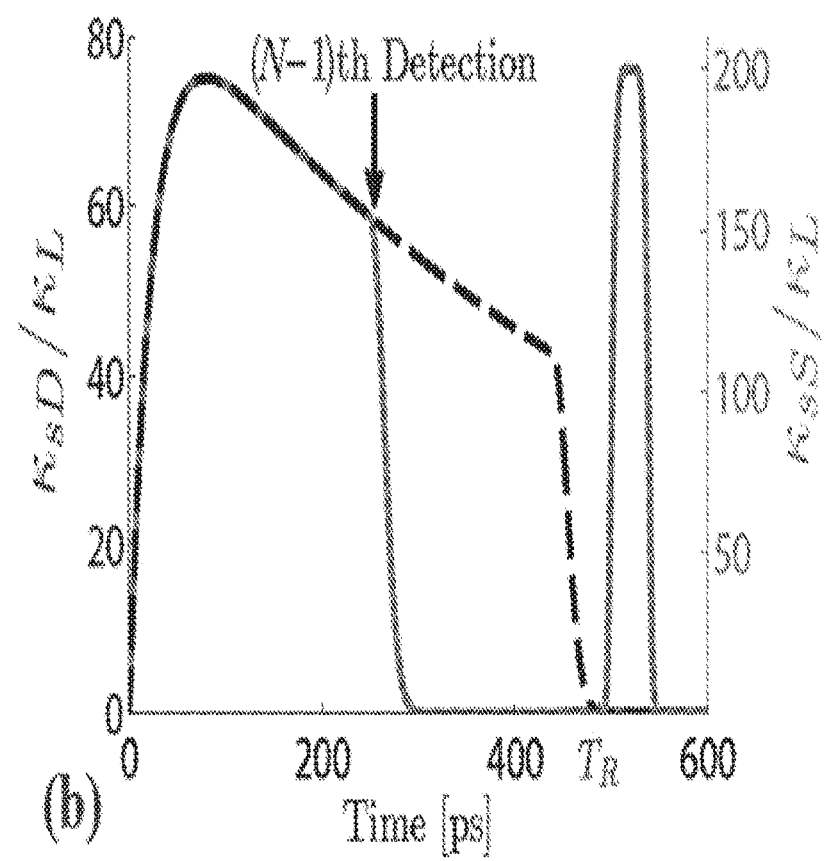
FIG. 3B shows an example protocol to release a single photon in the single-photon source shown in FIG. 3A.

FIG. 3B shows an example protocol for release, where the detector gate 330 coupling is turned off upon detection of the (N−1)th signal photon with N being the number of photons in the cavity after generation. For any protocol, the detector gate 330 coupling can be turned off before the release time, $T_R$, to allow the final state to exit through the signal gate. The shape of $\kappa_{sD}(t)$ can be optimized to increase the probability that one photon remains in the cavity at $T_R$ under the constraint that the fidelity, defined as the conditional probability P (1 photon|N−1 detected), exceeds a given threshold $T_p$. The driving protocol in FIG. 3B also describes the time dependence of the pump gate coupling, $\kappa_{pP}(t)$, and the detector gate coupling, $\kappa_{sD}(t)$, in response to detection events. Information from the detector 340 can be continuously fed back to the detector gate 330 to update the protocol in order to optimize the probability of producing the desired quantum state. This usage of "real-time" measurement information can be similar to adaptive quantum tomography, where each experiment in a series of measurements can be designed using the knowledge obtained from previous experiments.

FIG. 4A shows fidelity as a function of the detection time for a threshold value of 90% in the photon source shown in FIG. 3A. A flat fidelity curve indicates that the detector gate 330 coupling is being driven optimally. FIG. 4B shows the maximum success probability as a function of release time for different N, which is the number of photons in the cavity after generation.

Methods of Delivering Single Photons

Figure 5:
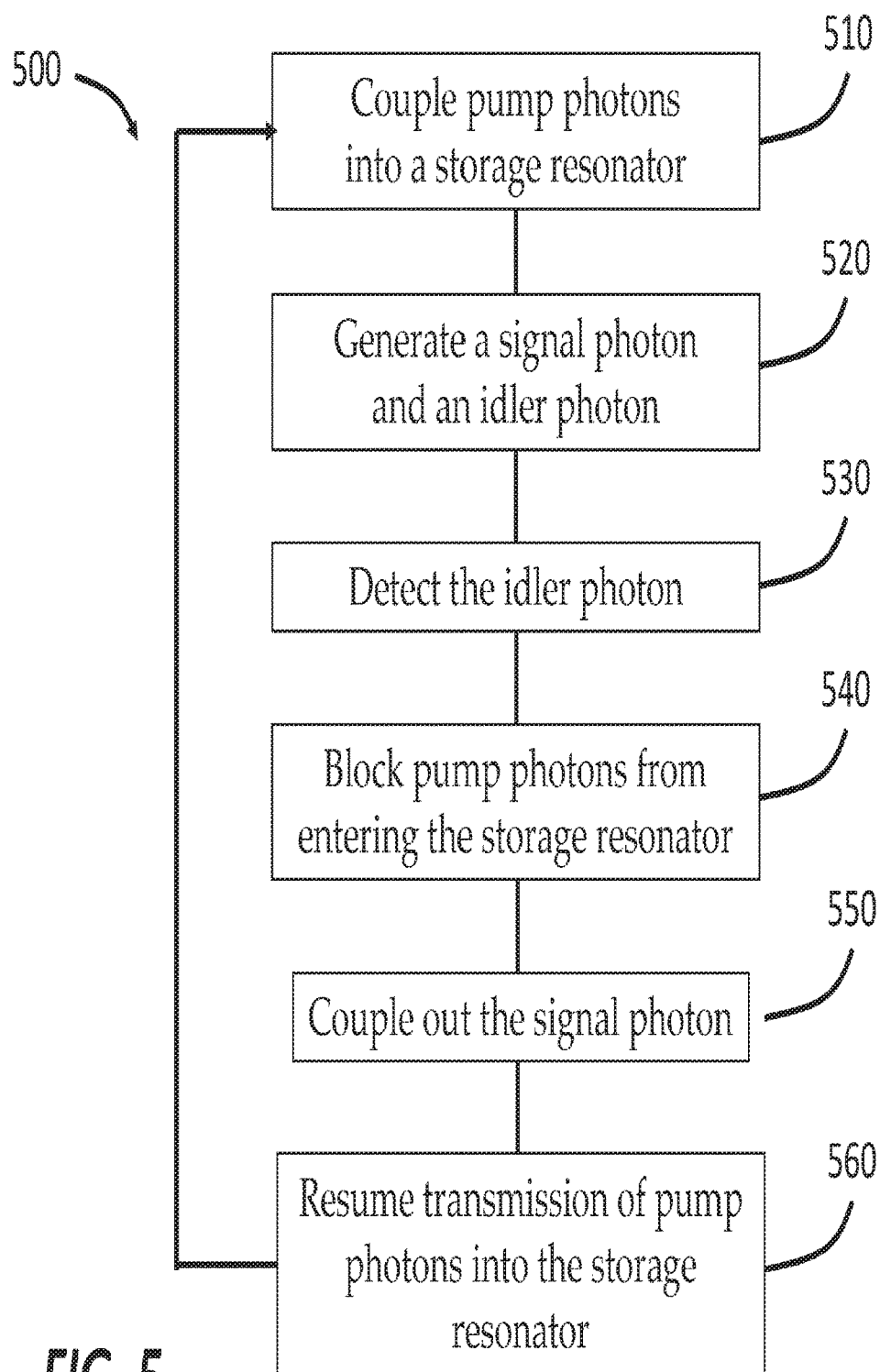
FIG. 5 illustrates a method of producing single photons.

FIG. 5 illustrates a method 500 of producing single photons using resonators for dynamic storage and delivery. The method 500 includes step 510, at which pump photons (e.g., at least two pump photons) are coupled into a storage resonator. The storage resonator can include nonlinear materials to allow the generation of a signal photon and an idler photon from two pump photons via four wave mixing at step

520. The generated signal photon and idler photon can circulate in the storage resonator until the idler photon is coupled out (e.g., using a frequency selective tunable gate) and detected at step 530. Upon detection of the idler photon (i.e., indication that a signal-idler pair has been generated in the storage ring), the method 500 proceeds to step 540, where pump photons are blocked from entering the storage resonator so as to reduce the chance of generating more than one pair of signal-idler photons. At step 550, the signal photon circulating in the storage resonator is coupled out and delivered to its destinations. At step 560, the transmission of pump photons is resumed and new pump photons are coupled to the storage resonator for generating signal-idler pairs. The method 500 therefore goes back to step 510 and starts another cycle of single photon production.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A single-photon source comprising:
   a first resonator to receive pump photons from a photon source and to generate a signal photon from the pump photons;
   a switch, optically coupled to the first resonator, to prevent transmission, in response to a first signal, and to allow transmission, in response to a second signal, of subsequent pump photons from the photon source to the first resonator; and
   a second resonator, optically coupled to the first resonator, to receive the signal photon out of the first resonator and, in response to the second signal, to couple the signal photon out of the first resonator.

2. The single-photon source of claim 1, wherein the first resonator comprises a ring resonator.

3. The single-photon source of claim 1, wherein the first resonator is configured to resonate at a first frequency and the second resonator is configured to resonate a second frequency different than the first frequency.

4. The single-photon source of claim 1, wherein the photon source comprises a laser source, in optical communication with the switch, to provide the pump photons.

5. The single-photon source of claim 1, wherein the second resonator is configured to resonate at a frequency of the signal photon in response to the second signal so as to couple the signal photon out of the second resonator.

6. The single-photon source of claim 1, wherein the second resonator is fabricated in a semiconductor substrate.

7. The single-photon source of claim 1, further comprising:
   a third resonator, optically coupled between the switch and the second resonator, to couple the pump photons from the photon source into the first resonator.

8. The single-photon source of claim 1, further comprising:
   a detector, operably coupled to the first resonator, to detect an idler photon generated from the pump photons and to generate the control signal in response to detecting the idler photon.

9. The single-photon source of claim 1, further comprising:
   a clock signal generator, operably coupled to the second resonator, to generate the second signal.

10. A method of delivering single photons, the method comprising:
    coupling pump photons at a pump frequency from a photon source to a resonator;

generating a signal photon at a signal frequency different than the pump frequency in the resonator from the pump photons;

preventing transmission of subsequent pump photons from the photon source to the resonator while the signal photon is in the resonator; and coupling the signal photon out of the resonator in response to a clock signal.

11. The method of claim 10, wherein coupling the pump photons from the photon source to the resonator comprises:

receiving the pump photons from the photon source using a pump resonator resonating at the pump frequency; and coupling the pump photons from the resonator to an additional resonator.

12. The method of claim 10, wherein generating the signal photon occurs via a degenerate four wave mixing process.

13. The method of claim 10, wherein preventing transmission of subsequent pump photons from the photon source to the resonator comprises:

detecting an idler photon created from the pump photons; and controlling a resonance frequency of the resonator based on detection of the idler photon.

14. The method of claim 13, wherein coupling the signal photon out of the resonator comprises changing the resonance frequency of the resonator to the signal frequency in response to the clock signal.

15. A single-photon source comprising:

a storage resonator to receive pump photons from a photon source at a pump frequency $\omega_P$ and to generate a signal photon at a signal frequency $\omega_s$ and an idler photon at an idler frequency $\omega_i$ from the pump photons, wherein the signal frequency $\omega_s$ is different than the idler frequency $\omega_i$;

a detector, operably coupled to the storage resonator, to detect the idler photon and to generate a control signal in response to detection of the idler photon;

a pump gate, operably coupled to the detector and optically coupled to the storage resonator, to prevent transmission, in response to the control signal, and to allow transmission, in response to a clock signal, of subsequent pump photons from the photon source to the storage resonator; and a signal gate, optically coupled to the storage resonator, to receive the signal photon out of the storage resonator and, in response to the clock signal, to couple the signal photon into an output coupler.

16. The single-photon source of claim 15, wherein the storage resonator is a ring resonator.

17. The single-photon source of claim 15, wherein the storage resonator is configured to resonate at the signal frequency $\omega_s$.

18. The single-photon source of claim 15, wherein the pump gate comprises:

a pump ring resonator, optically coupled to the storage resonator, to couple the pump photons from the photon source into the storage resonator, wherein the pump ring resonator is configured to resonate at the pump frequency $\omega_P$.

19. The single-photon source of claim 15, further comprising:

a detector gate, optically coupled between the storage resonator and the detector, to couple the idler photon from the storage resonator to the detector and block the signal photon from entering the detector.

20. The single-photon source of claim 19, further comprising:

a feedback link operably coupled to the detector and the detector gate, wherein the detector is further configured to transmit the control signal to the detector gate, via the feedback link, to turn off the detector gate.

* * * * *